Nov. 14, 1967  H. JACOBSON  3,352,342

LOCK NUT

Filed Nov. 26, 1965

INVENTOR
HARVEY JACOBSON
BY
ATTORNEY

United States Patent Office 3,352,342
Patented Nov. 14, 1967

3,352,342
LOCK NUT
Harvey Jacobson, 45 E. 72nd St.,
New York, N.Y. 10021
Filed Nov. 26, 1965, Ser. No. 509,850
2 Claims. (Cl. 151—21)

My invention relates to threaded nuts generally and specifically to a lock nut and methods for producing the same.

A wide variety of lock nuts are presently available. However, generally speaking, those which are commercially successful are relatively expensive. There is presently great need for a relatively inexpensive, durable lock nut which retains a high removal torque after a large number of removals.

One relatively expensive nut available today comprises a generally hexagonal body with an upstanding, annular collar on one face thereof. An internally threaded bore extends axially through the body and the collar. In order to provide locking action, the collar is deformed inwardly perpendicular to the axis of the nut on diametrically opposed sides thereof or, in some instances, at three points equally spaced about the circumference of the collar. The deformation effected by compressing the collar perpendicularly inwardly towards the axis of the bore is accomplished by engaging the sides of the collar by a flat, inwardly moving tool or tools. Such techniques produce an abrupt change in the radius of curvature of the internal threads of the collar along the line generally parallel to the axis of the bore therein. Thus, there are a plurality of abrupt, flat portions in the internal threads of the collar extending along the axis of the bore wherein the diameter of the threads is sharply reduced. These flattened thread portions frictionally engage the threads of the mating bolt to provide the locking action.

In practice, such lock nuts invariably gall the threads of the bolt weakening them and producing early failure particularly after the nut is removed several times. In addition, the removal torque decreases drastically after the first removal and thereafter decreases to a very low value. This galling and drastic reduction in removal torque is produced by the relatively small total area of frictional contact between the flattened thread portions of the collar and the bolt. Since the deforming tools engage the collar tangentially but move in a direction perpendicular to the axis of the bore, the radius of curvature of the internal threads is abruptly changed and rendered almost flat. The mechanical stress put on the threads of both the nut and the bolt at the flattened portion is extreme since the pressure exerted thereby must be borne by a relatively small total area of contact. Moreover, since the radius of curvature of the threads in the collar abruptly changes, they tend to clash or bite into the threads of the bolt with a total effect of galling both the threads of the nut and the bolt.

In order to avoid the aforementioned defects in existing lock nuts, I contemplate a lock nut wherein the locking pressure between the threads of the nut and the threads of the bolt is more evenly and widely distributed both circumferentially and axially throughout an internally threaded, integral, coaxial collar formed on one face of a hexagonal nut body. This wide distribution of locking forces arises from three independent and distinct locking features produced by my methods for deforming the internally threaded collar.

Therefore, it is among the objects and advantages of my invention to provide a lock nut in which a portion of the threads are depicted axially along an integral, internally threaded bore, the pitch of the threads within the bore becoming progressively larger beginning at a point where the collar engages the nut body and increasing axially outwardly toward the face of the collar.

Another object of my invention is to provide a lock nut in which a portion of the threads within the said collar are smoothly and gradually deformed inwardly towards the axis of the bore therein, thereby smoothly and gradually increasing the radius of curvature of that portion of the thread symmetrically over approximately 180 degrees in opposite sides of the bore, the diameter of the threads increasing from a maximum substantially equal to the diameter of the threads of the remainder of the nut to a minimum in that portion displaced 90 degrees in opposite sides of the maximum diameter, the threads of the deformed portion defining a generally elliptical configuration.

A further object of my invention is to provide a lock nut in which the side wall of the annular collar is invested with an angle inclining inwardly and upwardly toward the axis of the bore.

Still another object of my invention is to provide a lock nut in which the thickness of the collar decreases from the nut body toward the face of the collar rendering the collar more resilient at its outer end than at its inner end to provide a resilient, frictional locking grip between the bolt and the threads of the collar which action I call the "beam effect."

Yet another object of my invention is to provide methods for producing a lock nut of the character aforesaid in which an internally threaded, annular collar or annulus formed integrally and coaxially with one face of a hexagonal body is rolled between at least one cylindrical die and another die having an angle of 180 degrees or more in opposition to the cylindrical die, the cylindrical die rotating about an axis parallel to the axis of the annulus and the surface of the cylindrical die being spaced apart from the other die a distance slightly less than the external diameter of the annulus thereby smoothly and gradually deforming the annulus inwardly on diametrically opposed sides thereof along approximately 180 degrees.

Still another object of my invention is to provide methods for producing a lock nut in which the external surface of the annulus is inclined inwardly at an angle to the axis of the bore therein in order that rolling pressure produces an extruding elongation of the collar along the axis thereof to progressively depitch the threads in the collar.

These objects and advantages as well as other objects and advantages may be achieved by my methods and the lock nut produced thereby which is described hereinafter and which is illustrated in the drawings in which.

Figure 6:
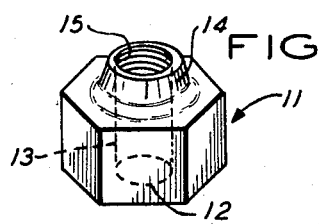
FIGURE 6 is a view in perspective of a nut blank.

Referring now to the drawings in detail, my lock nut is made from a blank 11 (illustrated in FIGURE 6) which comprises a hexagonal body 12 having an internally threaded bore 13. One face of the body 12 has an integral, annular collar or annulus 14 having an internally threaded bore 15 coaxial with and communicating with the bore 13 in the body 12. The bores 13 and 15 initially have the same diameter and their threads are continuous therethrough. While I have illustrated the annulus 14 as intersecting the body at 90 degrees, a radius may also be provided.

My method comprises rolling the collar or annulus 14 between a stationary, straight, flat die 16 and a rotating, cylindrical die 17. The face 18 of the flat die 16 and the face 19 of the rotating die 17 are parallel to the axis of rotation of the die 17. The nearest distance between dies 17 and 18 is slightly less than the initial, external diameter of the collar 14.

In operation, the annulus or collar 14 is inserted between dies 16 and 17 with the axis of the collar 14 parallel to the axis of rotation of the die 17. The die 17 rotates and the collar 14 in response thereto rolls over the flat die 16 and simultaneously rotates in a direction opposite from the cylindrical die 17. As the collar 14 is compressed between dies 16 and 17, it is smoothly and gradually deformed inwardly to assume a generally elliptical configuration, the actual curve being the resultant between the initial circle of the collar and the deformation due to the decreasing distance between the flat die 16 and the rotating cylindrical die 17. In order to make the deformation as gradual as possible, and to extend the deformation symmetrically over a maximum portion of the circumference of the collar 14, the collar should rotate approximately 90 degrees between the point of first engagement with the dies 16 and 17 and the point of nearest approach between the dies 16 and 17.

A deformation of collar 14 produces a gradual increase in the radius of curvature of its internal threads 20 concomitantly with a decrease in the pitch diameter. Under optimum conditions, the deformation extends symmetrically over approximately 180 degrees of the bore 15 on diametrically opposite sides thereof. Thus, the pitch diameter of the threads 20 of the collar 14 is substantially equal to the pitch diameter of threads 21 in the bore 13 of the body 12 along two diametrically opposed lines parallel to the axis of the bore 15. However, the pitch diameter of threads 20 smoothly and gradually decreases on each side thereof to a minimum displaced approximately 90 degrees on both sides of the lines of equality.

The second locking action produced by rolling deformation of the collar 14, is the depitching of the threads 20. The collar 14 tends to extrude or lengthen along its axis thereby increasing thread pitch therein. The increase in thread pitch occurs at all points along the axis of the collar 14 and thus, evenly distributes the bearing load on the threads of the mating bolt which has a slightly smaller thread pitch.

Figure 4:
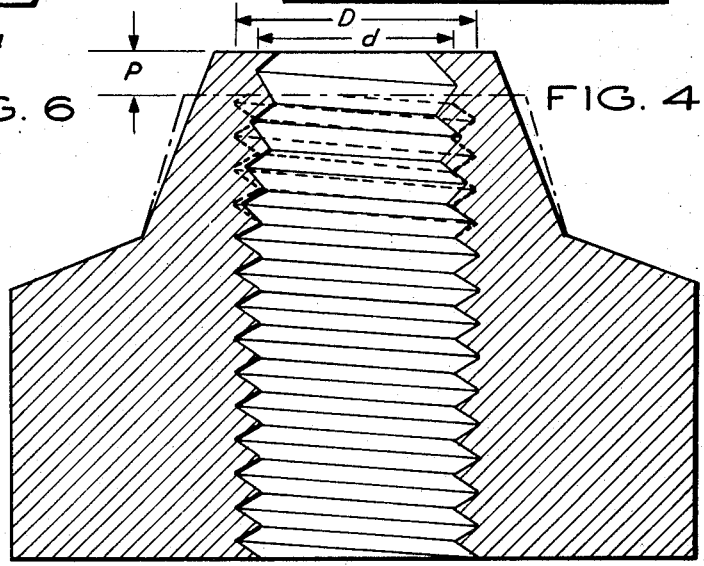
FIGURE 4 is a side elevational view of my lock nut taken along line 4—4 in FIGURE 3 looking in the direction of the arrows and showing the initial pitch and configuration of the threaded collar in broken lines.
Figure 7:
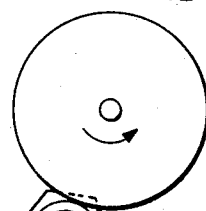
FIGURE 7 is a schematic side elevational view of two cylindrical dies engaging a nut blank.

FIGURE 4 illustrates the deformation of the threads in the annulus inwardly towards the axis of the bore so that the minor diameter, $d$, is less than the major diameter, $D$, which major diameter is equal to the diameter of the threads in the remainder of the bore in the nut body 12. The extrusion of the collar 14 axially toward the top face thereof depitches the threads progressively from the nut body 12 to the face of the annulus or collar 14. In FIGURE 4, the initial pitch of the threads and the initial diameter thereof in the collar 14 is illustrated in broken lines and the final pitch and diameter, which in this case is the minor diameter is illustrated in solid lines.

Figure 1:
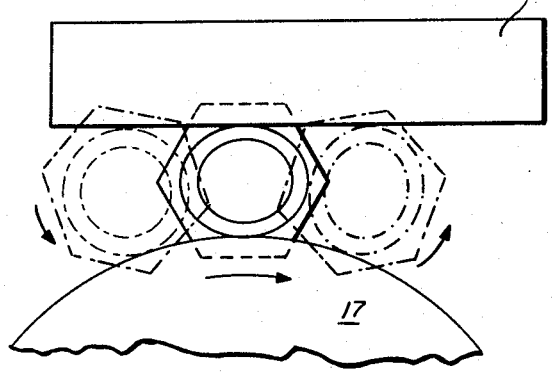
FIGURE 1 is a schematic, side elevational view of a stationary, flat die, a rotational, cylindrical die and a nut blank being deformed therebetween in sequence.
Figure 2:
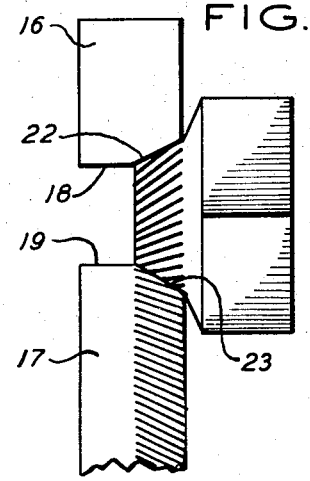
FIGURE 2 is a schematic end elevational view of the apparatus shown in FIGURE 1.
Figure 3:
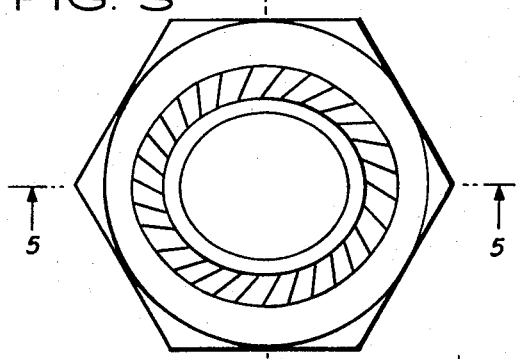
FIGURE 3 is a top plan view of my lock nut.
Figure 5:
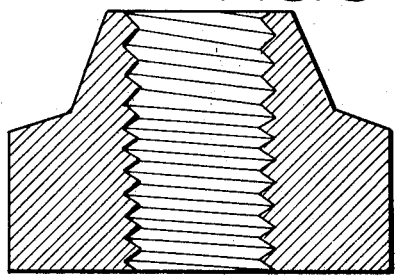
FIGURE 5 is a side elevational view of my lock nut taken along line 5—5 in FIGURE 3 looking in the direction of the arrows.

In FIGURE 5, only the depitching of the threads in the collar 14 is illustrated since this view is a cross-section taken along 5—5 which is the major diameter of both the deformed annulus 14 and the nut body bore 13.

The third locking action is produced by what I call the "beam effect." If the collar 14 is thicker at its base where it joins the body 12 than at its top, it will be more resilient at the top. This resilience insures a maximum grip on the bolt while minimizing the danger of galling. The thickness of the collar may be produced by providing an arcuate edge 22 on the flat die 16 and an arcuate rim 23 on the cylindrical die 17. The collar 14 is thus, invested with a radius 24 at its base. However, in order to minimize material flow throughout the collar 14, the radius may be invested in the blank 11 during the cold heading processs. I have illustrated the rotating die 17 as having a plurality of serrations 24 along its arcuate edge 23. These serrations 24 provide a positive grip between the collar 14 and the die 17 as well as produce a distinctive surface ornamentation on the external surface of the finished collar 14.

The following table illustrates the increase in ultimate removal torque over that required by the industry for three different size nuts.

| Nut Size | Torque On | Torque First Removal | Torque Fifth Removal | Torque Fifteenth Removal |
| --- | --- | --- | --- | --- |
| ½ in.-20 Accepted Standard | 150 in./lbs. (max.) | 22 in./lbs. (minimum) | 15 in./lbs. (minimum) | 50.0-44.0 in./lbs. |
| Test Nut | 90 in./lbs. | 73.0-73.0 in./lbs. | 53.0-43.0 in./lbs. | |
| ⅝ in.-11 Accepted Standard | 300 in./lbs. (max.) | 39 in./lbs. (minimum) | 27 in./lbs. (minimum) | 80.0-70.0 in./lbs. |
| Test Nut | 160 lbs. (max.) | 115-120 in./lbs. | 85.0-80.0 in./lbs. | |
| ¾ in.-10 Accepted Standard | 400 in./lbs. (max.) | 58 in./lbs. (minimum) | 41 in./lbs. (minimum) | 140-160 in./lbs. |
| Test Nut | 204 in./lbs. (max.) | 168-180 in./lbs. | 120-170 in./lbs. | |

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:
1. A lock nut comprising,
   (a) a non-circular body portion,
   (b) an annular collar on one face of the body, the body and collar having a continuous threaded, transverse bore,
   (c) the external wall of the collar being tapered to define a progressively thinner, resilient wall portion from the body to the opposite end of the collar,
   (d) the pitch of the thread in the body portion being substantially constant,
   (e) the pitch of the thread in the collar being progressively greater with respect to the thread in the body from the body to the opposite end of the collar.

2. A lock nut comprising,
   (a) the structure in accordance with claim 1, in which,
   (b) the pitch diameter of the thread in the collar is diminished along the entire axis thereof only on two generally opposing sides thereof, the said diminished diameter being an arc of continuously changing radius such that the minimum diameter is less than the maximum diameter of the thread on the mating member.

References Cited
UNITED STATES PATENTS

| | | | |
| --- | --- | --- | --- |
| 197,467 | 11/1877 | Harvey | 151—22 |
| 1,692,497 | 11/1928 | Furlan | 10—86 |

FOREIGN PATENTS 1,314,390   12/1962   France.

CARL W. TOMLIN, *Primary Examiner.*

R. S. BRITTS, *Assistant Examiner.*